Dec. 29, 1925.

E. E. KLEINSCHMIDT 1,567,599

TELEGRAPH TYPEWRITER

Filed August 11, 1923    9 Sheets-Sheet 1

Inventor
Edward E. Kleinschmidt
By William A. Strauch
Attorney

Dec. 29, 1925. 1,567,599
E. E. KLEINSCHMIDT
TELEGRAPH TYPEWRITER
Filed August 11, 1923  9 Sheets-Sheet 2

Inventor
Edward E. Kleinschmidt
By William A. Strauch
Attorney

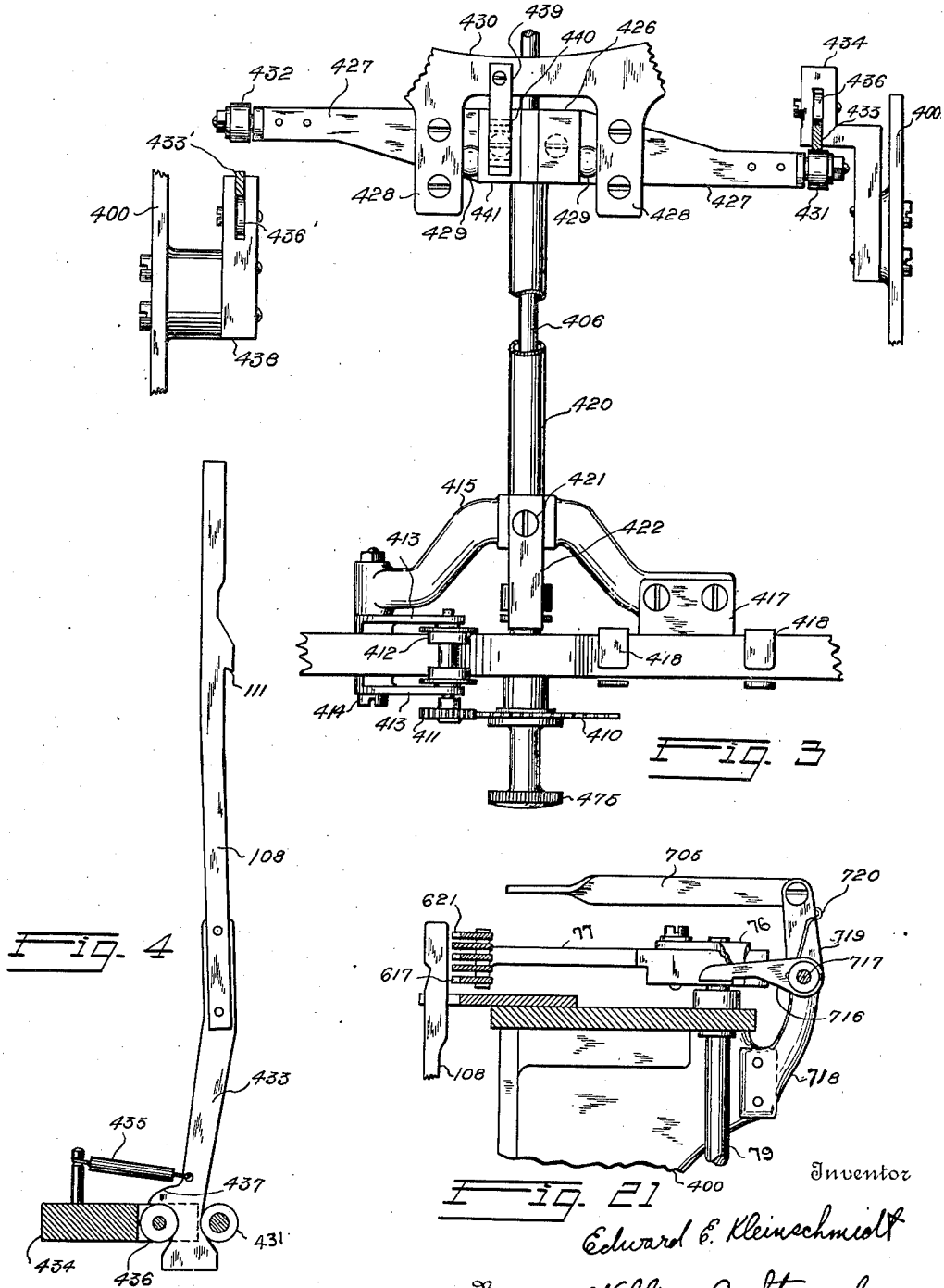

Dec. 29, 1925.

E. E. KLEINSCHMIDT

TELEGRAPH TYPEWRITER

Filed August 11, 1923    9 Sheets-Sheet 4

1,567,599

Inventor
Edward E. Kleinschmidt
William A. Strauch
By
Attorney

INVENTOR
Edward E. Kleinschmidt
BY William A. Strauch
ATTORNEY

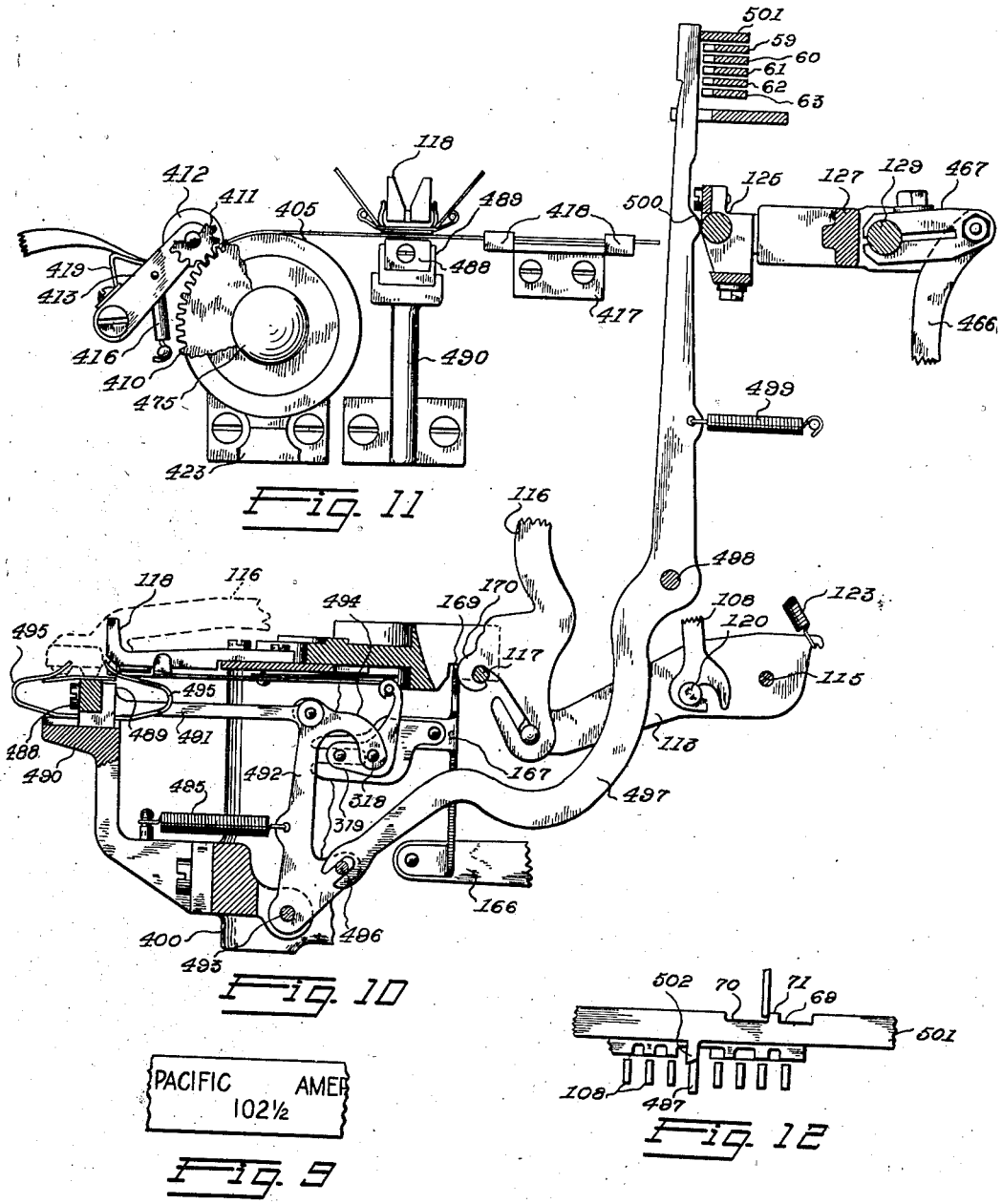

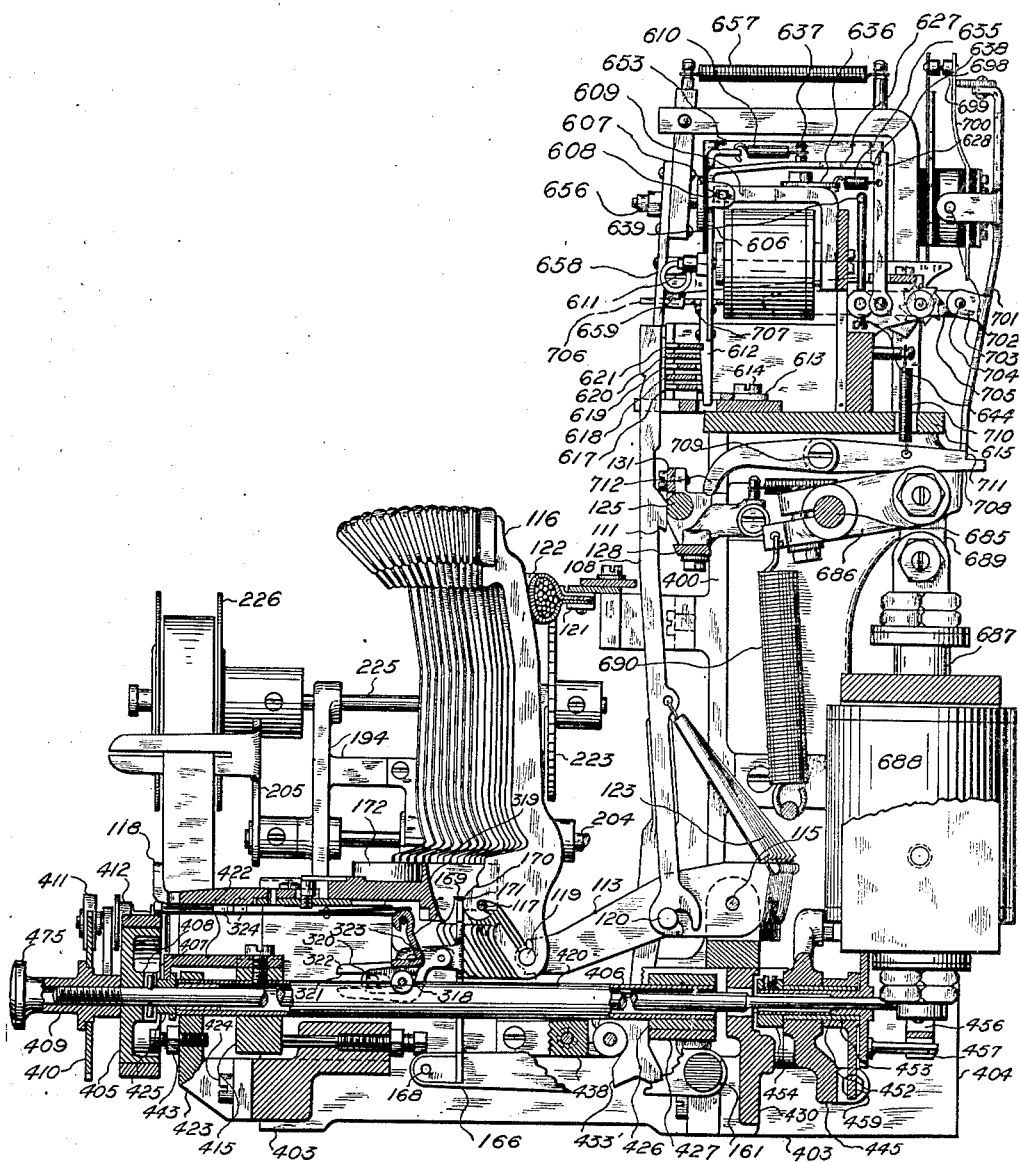

Dec. 29, 1925.  
E. E. KLEINSCHMIDT  
1,567,599  
TELEGRAPH TYPEWRITER  
Filed August 11, 1923    9 Sheets-Sheet 9
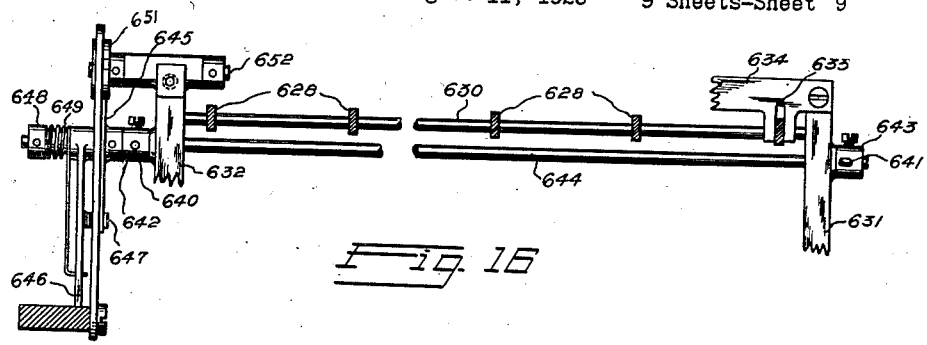
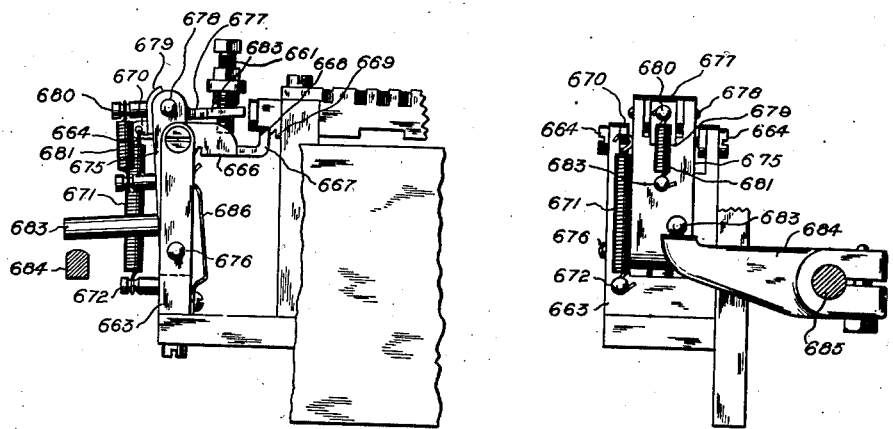
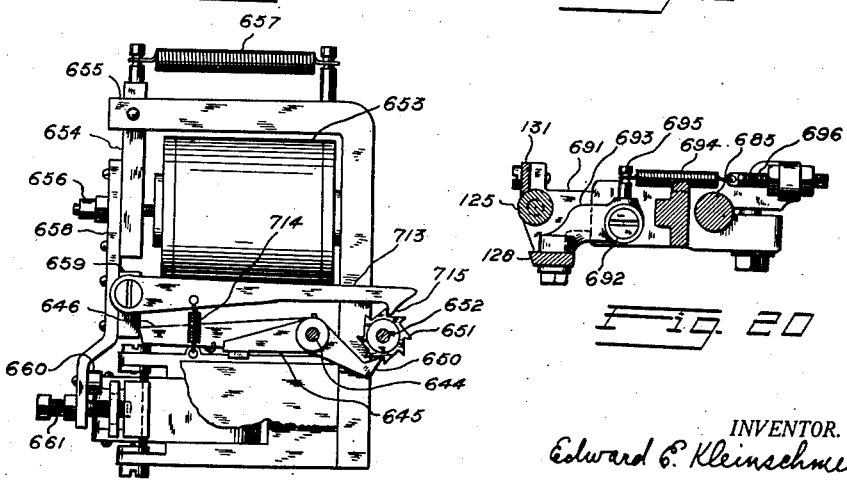
INVENTOR.  
Edward E. Kleinschmidt  
BY  
William A. Strauch  
ATTORNEY.

Patented Dec. 29, 1925.

1,567,599

UNITED STATES PATENT OFFICE.

EDWARD E. KLEINSCHMIDT, OF LONG ISLAND CITY, NEW YORK, ASSIGNOR, BY MESNE ASSIGNMENTS, TO MORKRUM-KLEINSCHMIDT CORPORATION, OF CHICAGO, ILLINOIS, A CORPORATION OF DELAWARE.

TELEGRAPH TYPEWRITER.

Application filed August 11, 1923. Serial No. 656,857.

*To all whom it may concern:*

Be it known that EDWARD E. KLEINSCHMIDT, a citizen of the United States, residing at Long Island City, in the county of Queens and State of New York, has invented certain new and useful Improvements in Telegraph Typewriters, of which the following is a specification.

This invention relates to printing telegraph machines of a type selectively controlled by permutations of electrical impulses.

The primary object of the invention is the provision of new and improved mechanisms usable interchangeably in various types of printing machines such for example, as in a tape printer or a page printer.

Another object of the invention is to provide a new and improved arrangement of selector mechanisms, type and printing actions, ribbon feed mechanism, type guides and frame work, each so constructed and assembled that they may be used to print in a substantially horizontal plane for tape printing or by turning the frame work over, may be set to print in a substantially vertical plane for page printing. This interchangeability of parts and the arrangement thereof is an important feature in reducing cost of manufacture and maintenance of printers and the structure and methods invented to make possible this interchangeability mark a wide advance in the art.

A further object of the invention is to provide a tape printing mechanism which utilizes the type action, guides, ribbon feed, and ribbon shift mechanism as disclosed in co-pending application Serial No. 649,562, filed July 5, 1923, together with the motor driven cam actuated printing and single magnet selector mechanisms therein disclosed, or with new and improved magnet printing and multiple magnet selector mechanisms as hereinafter disclosed, and so assembling the mechanisms enumerated as to be operable in a page printer by turning the assembly over so that printing will be effected against a platen carried by and arranged as set forth in the said co-pending application.

Still another object of the invention is to provide a new and improved form of spacing mechanism which may be readily adapted to use with a magnet operated printing mechanism as herein disclosed and applied to a page printer utilizing the single magnet motor driven selector such as disclosed in the co-pending application, or a multiple magnet selector as herein disclosed.

Another object of the invention is to provide a multiple magnet selector which may be substituted bodily for the single magnet selector in the page printer disclosed in the co-pending case.

A further object of the invention is to provide a new and more efficient tape printer than has heretofore been produced, with new shift mechanisms, new spacing mechanisms, and visible printing mechanism.

Still other objects will appear hereinafter in the detailed disclosure of the preferred embodiment of the invention of which—

Figure 3 is a fragmental detail view showing the carriage construction and shift mechanism.

Figure 4 is a detail of the shift and unshift bars.

Figure 9 is a view of a special stock ticker tape.

Figure 10 is a side fragmental view showing a modified form of shift mechanism.

Figure 11 is a fragmental end view of the mechanism shown in Figure 10.

Figure 12 is a fragmental detail view showing selector bar control for the modified shift mechanism of Figures 10 and 11.

Figure 14 is a side elevation of the printer shown in Figure 13, partially in section to show the details of the magnet operated printing bail.

Figure 16 is a detail fragmental view showing the selector magnet armature restoring mechanism.

Figure 17 is a fragmental view partially in section with parts broken away to show the sixth pulse or operating magnet of the multiple magnet selector.

Figure 18 is a fragmental view showing the selector bar control and restoring mechanism of the multiple magnet selector.

Figure 19 is an end view of the mechanism shown in Figure 18.

Figure 20 is a detail sectional view of the magnet operated printing bail structure.

Figure 21 shows a modified form of cam actuated multiple magnet printer control.

Figure 1:
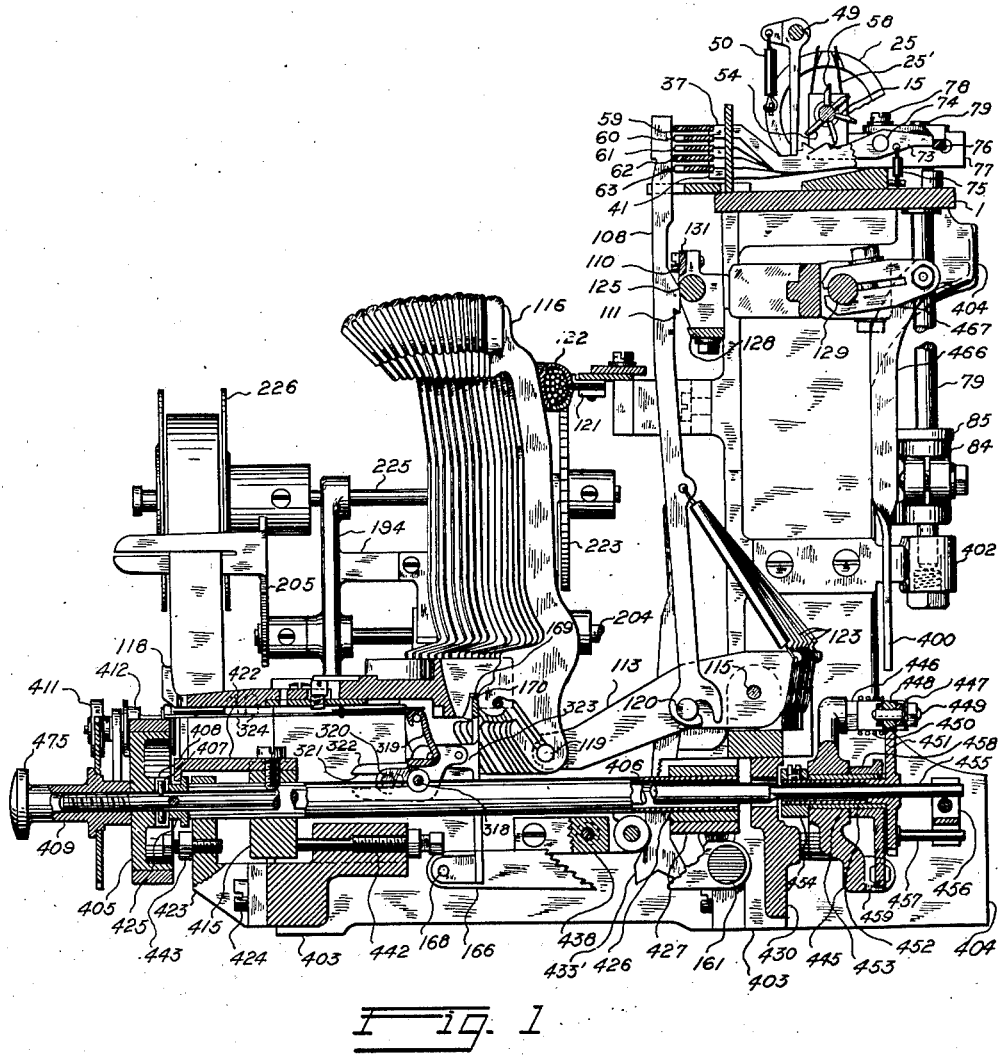
Figure 1 is a sectional side elevation showing the mechanisms adapted to a tape printer.

*Mechanism common to tape and page printers.*

In view of the fact that much of the mechanism and operation of both the single and multiple magnet forms are the same as disclosed in co-pending application Serial No. 649,562, the reference characters there used will be applied to like parts here and referred to in a general way only, reference being had to the co-pending case for an understanding of the complete duplicate mechanisms, their functions, and operation.

Figure 2:
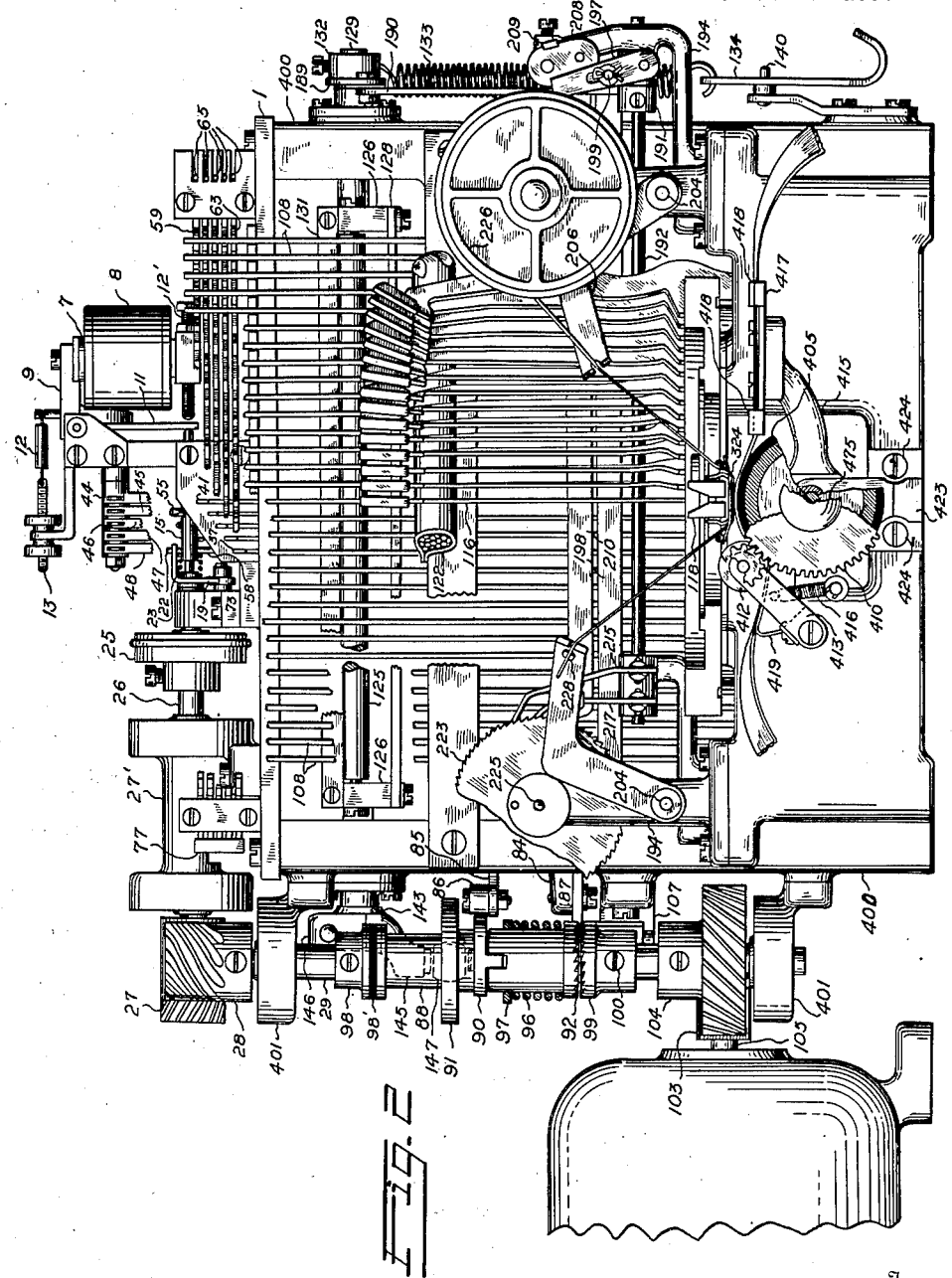
Figure 2 is a front view of the tape printer.

Referring to Figures 1 and 2, the impulses are received on magnet coils 8 and operate armature 11 to shift cam shaft 15 axially. The first axial movement starts shaft 15 into rotation and the succeeding impulses set fingers 37 to 41 through cams 54 to 58, the actuated ones of these fingers being locked in actuated position by latches 44 to 48. When the fingers have been completely set cam 19 trips member 73 which releases members 76 and 77 to permit the selected ones of notched bars 59 to 63 to move to selected position under influence of springs 65 and in accordance with the setting of fingers 37 to 41. As soon as cam 19 trips member 73, shaft 15 comes to rest in zero position, and resetting of fingers 37 to 41 may proceed in accordance with the succeeding signal. Cam shaft 15 is driven by friction clutch member 25 from a shaft 26 which in turn is driven from a continuously rotating motor driven shaft 29 through spiral gears 27 and 28.

Movement of the notched bars to selected position moves member 77 to rock spindle 79, and arm 84 drops stop arm 87 permitting clutch member 92 on sleeve 88 to move under influence of spring 96 into engagement with clutch member 99 secured to shaft 29. This starts sleeve 88 with cam 90 and 91 into rotation. At the end of one revolution members 92 and 99 will be disengaged. Friction members 98 and 98¹ will hold sleeve 88 in zero position until another revolution is initiated by movement of the selector bars. Cam 90 operates towards the end of a revolution of sleeve 88 to restore the notched selector bars to unselected position and to permit member 73 to again lock member 76, as shown more fully in the co-pending case.

As cam 91 rotates, the printer operating bail frame moves upward in Figure 1 under the influence of spring 133 on printer bail frame shaft 129 to effect a printing stroke. Spring 133 acts on shaft 129 through arm 132, and the tension thereof is adjustable during operation by changing the registration of holes in member 134 with pin 140. Upward movement of the printer bail frame first causes all of the actuating bars 108 to move to the right in Figure 1 with surface 110 against member 125, under the influence of springs 123, until they strike projections of the selector bars 59 to 63. All except the selected one of bars 108 will then come to rest. The selected one of the bars will continue to move until it enters into the aligned selector bar slots, then bar 128 will engage shoulder 111 of the selected bar and move it across the aligned slots. This movement of the selected bar acts on its member 113 to cause a forward and downward movement of a selected typebar 116. Spring 133 carries the type bar down under control of cam 91 until the type is pressed against the tape. After the impression has been made, cam 91 actuates arm 145 to move the printer bail frame down storing energy in spring 133 to effect the succeeding printing stroke. As the bail frame moves downward, spring 123 moves the selected bar 108 downward in the aligned slots and raises the selected type bar 116 to rest position against pad 122. When 116 has been restored to rest position, bar 125 engages surface 110 of the selected bar 108 and first clears it from the aligned slots, and towards the end of the return stroke all the bars 108 are raised clear of the selector bar projections. The pivotal points 115 and 117 of members 113 and type bars 116 are reversed curves and the type bars are arranged to strike between guides 118 as fully explained in the co-pending case. As in the co-pending case, operation of the printer bail oscillates arm 191 on shaft 192 through arm 189 and link 190. This rocks shaft 192, stepping pawl 217, and ratchet wheel 223, to feed the ribbon step by step. When knob 228 on an end of the ribbon is drawn against the slot in either arm 205 or 206, as the case may be, bar 198 is shifted through shaft 204 and shifts arm 197 to a position where it will engage lug 209 and shift bar 210 to reverse the ribbon feed.

As a type bar approaches the end of the printing stroke, cam surface 170 engages edge 169 of universal bar 167 and forces the bar downward on pivoted arms 166 against the tension of spring 176. Arms 166 are pivoted on a spindle 161 and spring 176 is fastened to a suitable support as shown in the co-pending case. Movement of universal bar 167 shifts members 323 and 322 in a manner to rock member 319 through pin 320 about a pivotal support 318. Movement of 319 shifts member 324 to carry the ribbon into position for printing just before the impression is made. As soon as the actuated type bar raises, spring 176 returns the universal bar, and member 324 with the ribbon will be withdrawn to expose the printed character immediately to view. Pivotal point 318 and member 319 are shifted with the shift mechanism; pin 320 being movable in slot 321 for this purpose.

The mechanisms whose operations have so far been generally described are exactly the same as disclosed in the co-pending case except for the position of shoulders 111 on actuating bars 108, which may also be the same as there disclosed if so desired; and the support of spring 133 which has been simplified. Shoulder 111 is here shown slightly recessed. The frame work has been here changed to support shaft 29 and spindle 76 in outside and more accessible positions. This has resulted in a simplification of cam 91, so that the edge, rather than a face has been made the controlling surface, the functions, however, remaining the same. Side frames 400 replace side frames 2 of the co-pending case, and selector base 1 forms the top tie plate between these frames. Journals 401 support shaft 29 in vertical position so that gear 28 will mesh with gear 27. Spindle 79 is journaled in base plate 1 and in a bearing 402 secured to side frame 400. Side frames 400 are provided with surfaces 403 upon which they rest when the mechanisms so far described are used in a tape printer, and with surfaces 404 upon which they rest when the mechanism is used as a page printer. With the mechanism turned to rest on surfaces 404 and bars 108 substantially horizontal, Figure 1 represents a sectional side elevation of the selector mechanism, type action and ribbon mechanisms so far described, as they are used in the page printer. Figure 2 as shown represents a front elevation of the tape printer, and a plan view seen from the rear of the mechanisms so far described as they are used in a page printer. It will be seen that a novel and very useful arrangement of mechanism has been produced in which the type action is adapted to strike upwardly or downwardly on a printing stroke. When used in a tape printer the type is fixed so that the message may be read from the front of the machine as printed. To adapt the action to a page printer the type must be reversed, and this is the only change necessary.

*Platen, carriage, and shift mechanisms.*

The mechanisms useful in both page and tape printers having been considered, the new tape printer mechanisms remain to be taken up. Reference numerals beginning in the four hundreds are adopted to denote the parts which differ from the page printer parts, reference numerals lower than this having been used to denote parts usable in the page printer.

A platen wheel 405 is loosely mounted on a shaft 406 and is driven therewith by means of a pin 407 driven through shaft 406 and fitting slidably in a slot 408 cut in the hub of wheel 405. A clamping nut 409 is provided which clamps platen wheel 405 securely to shaft 406 in easily removable manner. Rigidly secured to 409 is a gear 410 which meshes with a pinion 411. Pinion 411 drives a feed roll 412 which is rotatably journaled in arms 413, pivotally mounted by means of a pin 414 on a member 415. A spring 416 acts through arms 413 to press arm 412 against platen wheel 5. Supported from member 415 is a tape guide member 417 provided with guide projections 418 through which the tape is fed to the feed roll. A guide member 419 is secured to arms 413 and is arranged to guide the tape away from the platen in a manner to expose a section of the printed tape to view immediately after printing has been effected.

Member 415 is rigidly secured to sleeve 420 by means of a screw 421 which also secures an extension 422 thereto. The forward end of sleeve 420 is slidably supported in a bracket 423 which is suitably secured to frame 400 by screws 424 or in any other suitable manner. Shaft 406 is journaled at its forward end in sleeve 420, and has secured thereto a collar 425, held rotatably in abutment against the forward end of sleeve 420 by means of a downward projection on extension 422. This connection is such that shaft 406 is rotatable within and slidable with sleeve 420. The rear end of sleeve 420 is rigidly secured to a carriage member 426. Member 426 is mounted on a carriage 427 which in turn is slidably carried and guided in suitable ball race and guide extensions 428 on balls 429. Guide extensions 428 are formed integrally with a supporting member 430 which is secured in suitable manner from frames 400.

Rotatably mounted on the wings of carriage 427 are a carriage shift roller 431 and a carriage unshift roller 432. Roller 431 is positioned to co-act with cam extension 433 of a carriage shift actuating bar 108. Extension 433 is slidable in a guide member 434 which is supported from frame 400. A spring 435 holds extension 433 against a roller 436 supported in guide member 434 and assists the effect of gravity in restoring the shift bar 108 after it has been actuated by the operating bail. A projection 437 of cam extension 433 supports the shift bar and cam extension in unactuated position.

It will be seen that upward movement of the shift actuating bar 108 will cause cam extension 433 to wedge carriage member 427, with sleeve 420, member 415, shaft 406, the platen and tape bodily forward. This forward movement is continued until unshift roller 432 engages an unshift cam extension 433¹ of an unshift actuating bar 108. Extension 433¹ is similar in shape to extension 433 and is held against and supported by a roller 436¹ in a guide member 438 in a manner similar to the way in which 433 is spring held and supported. Actuation of the unshift actuating bar, with the parts in shifted position will return the parts to unshifted position as shown in Figure 3. Ribbon shift member 319 is pivoted at 318 to sleeve 420, and moves with the carriage to properly position the ribbon.

To shift the carriage, the shift actuating bar is selected, and on the upward or printing stroke of the bail frame, the platen and tape feed parts will be moved into shifted position. On the downward stroke of the bail the shift bar with cam extension 433 will be restored but the carriage will remain in shifted position. In a similar manner the carriage is moved to unshifted position by actuation of the unshift actuating bar.

The weight of the carriage is sufficient to maintain it in either position, but in order to insure against accidental movement, a locking and centering spring 439 with a V-shaped end secured to member 430, and adapted to register with V-shaped notches 440 and 441 on carriage 427 may be provided. Adjustable stop screws 442 and 443 are also provided to co-act with member 415 and limit the carriage movement.

Spacing mechanism.

A novel form of spacing mechanism is provided which is set by actuation of the type-bars, and actuated directly from the printer bail shaft on the return stroke thereof. This gives a power driven positive feed movement of the tape in which the full time of the return stroke of the bail shaft is utilized, avoiding the jerky feed motion of tape printers heretofore used. The powerful, smooth and even feed of the tape attained by the present mechanism avoids the continual tearing of the tape occurring in prior art machines. A further advantage is attained in that an impulse is given to start the actuated bars on the return movement in event the type bar becomes hung up on a frayed ribbon or in any other manner. Although shown as used in a tape printer, it will be obvious to one skilled in the art that this spacing mechanism could be used in the co-pending case in place of the spacing mechanism there used.

Secured to the rear of 430 by means of screws 444 is a supporting member 445 which has formed thereon an extension 446. An arm 447 carrying a jockey roller 448 is pivotally mounted on 446 by means of a pin 449. A helical spring 450 presses roller 448 downward against the teeth of spacing ratchet wheel 451 which acts to center the ratchet wheel and at the same time permits free rotation thereof in either direction. Ratchet wheel 451 has integrally formed thereon a sleeve 452 which is journaled in a bushing 453 rigidly secured in support 445. A collar 454 fastened securely to sleeve 453 and abutting against member 445 holds ratchet wheel 451 against the end of bushing 453 in a manner to prevent endwise movement, while permitting rotary movement of the ratchet. A reduced extension 455 of shaft 406 is slidably-supported in sleeve 452. Fastened to the end of 455 is a driving arm 456 which engages a pin 457 secured to ratchet wheel 451 and slidable in a slot in arm 456. This connection permits driving of shaft 406 through ratchet wheel 451 in either shift or unshift position of the carriage.

Pivotally mounted on bushing 453 is a member 458 having formed integrally therewith extensions 459, 460 and 461. Extension 459 co-acts with adjustable stop screws 462 to limit the pivotal movement of member 458. Extension 460 has pivotally mounted thereon a driving pawl 463 which is held in engagement with the teeth of ratchet wheel 451 by means of a spring 464¹. Secured to extension 461 by means of a pin extending through a slot 465 is a driving link 466. Link 466 is pivoted at its other end to an arm 467 which is rigidly secured to printer bail shaft 129.

A member 468, pivoted on a support (not shown) at a point 469 is held against a notch in 461 by means of a spring 470 secured to an arm 166. A link 471, pivoted to arm 468 by means of screw 472, has a slot 473 in the other end thereof through which a pin 474 connects it to arm 166.

Figure 7:
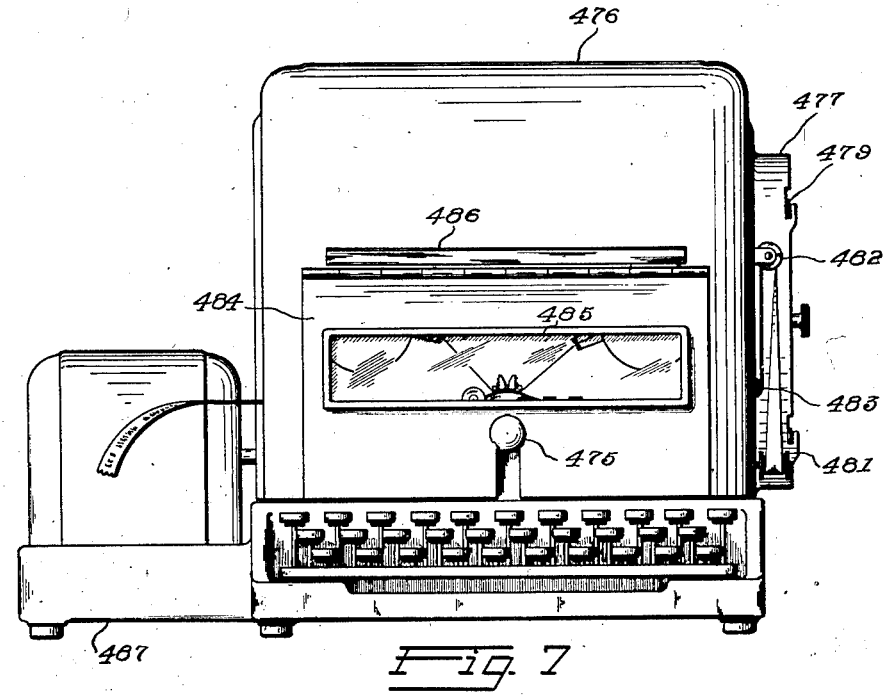
Figure 7 is a front elevation showing the assembly of the printer on a keyboard transmitter, and the tape reel.
Figure 8:
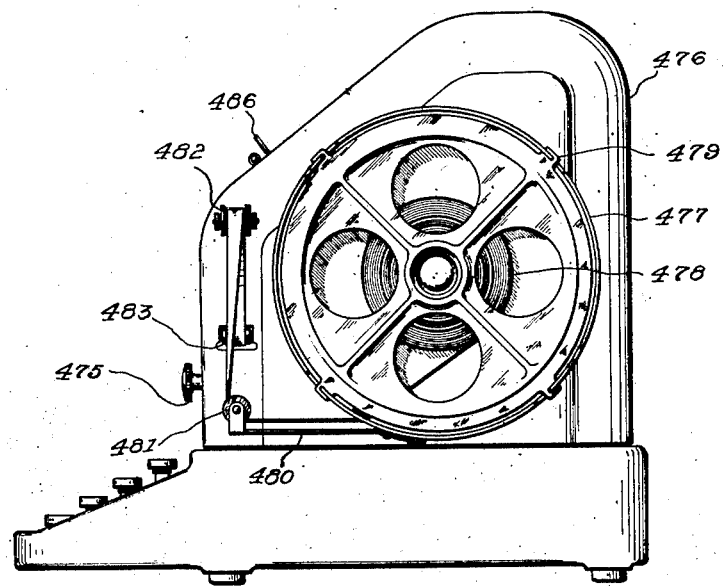
Figure 8 is a side elevation of the arrangement in Figure 7.

The operation of the spacing mechanism is as follows. On the upward or printing stroke of the operating bail frame, arm 467 pushes link 466 downward. Member 461 will be unaffected, however, as slot 465 will simply slide on pin 464 during this movement. As the printing stroke continues, cam surface 170 of the selected actuating bar will engage edge 169 of universal bar 167 and will rock arm 166 downwardly. This movement of 166 will be transmitted through spring 470 and link 471 to arm 468, which in turn will push on arm 461, and rock member 458 until extension 459 engages the stop screw 462. In this position of 458, pawl 463 will have been moved to engage the succeeding tooth of ratchet wheel 451, and the lower edge of slot 465 will be in position to engage pin 464. On the return movement of the printer operating bail, cam 91 will drive link 466 through shaft 129 and arm 467 to engage pin 465, driving ratchet wheel 451 ahead one step. At the same time 461 will force arm 468 upward. If a type bar should stick, spring 470 will give until the bottom of slot 473 engages pin 474, when the driving force of cam 91 will aid spring 176 to return universal bar 167 and force the stuck type bar upward. The stepping of ratchet 451 rotates shaft 406 and platen wheel 405 a distance of a letter space for each step and at the same time drives paper feed roller 412 through gear 410 and pinion 411 to drive the tape. A knurled knob 475 is provided by means of which the tape may be moved ahead or backward any desired number of steps. To avoid all possibility of the tape tearing during the feeding operation, a special arrangement is provided. On cover 476 (Figures 7 and 8) an extension 477 is formed in which is rotatably supported a tape reel 478. Reel 478 is removably held in position by a cover plate 479 which is detachably secured to 477, by slot and bayonet connections, or in any convenient manner. Secured to 477 is a spring member 480 in which is mounted a tape guide roller 481. A guide roller 482 is secured to the side of cover 476, and a roller 483 is mounted to guide the tape through an opening in the cover to the guide member 417. A hinged front plate 484 with a window 485 is provided to permit easy access to the tape and a view of the printing as it occurs. A member 486 is fastened to the cover and provides a convenient place for the operator to place copies of matter to be transmitted.

In operation, as the tape is fed, spring 480 will give sufficiently to permit sudden feeding of the tape, and the tension thereof will cause the tape reel to turn, after the tape feed has been completed and while the printing stroke is occurring, in this manner giving a substantially uniform and even movement of the tape reel, with a step by step tape feed at the platen.

A motor base 487 is provided upon which the motor rests, and as set forth in the copending case this motor may be utilized to drive a keyboard or tape transmitter. A keyboard mechanism such as is disclosed in the co-pending case is preferably utilized, although any form of start-stop transmitting mechanism may be used.

Modified shift mechanism.

In printers for transmitting stock market quotations, a wide tape is used and letters are printed in one line, while figures are printed in another line as shown in Figure 9. As a result of the matter transmitted, many more shift operations occur than is usual in ordinary message transmission. As each shift and unshift operation requires the sending of a special code combination in the ordinary permutation code controlled printer, the speed of operation is slowed up materially. To overcome these objections to a permutation code control for stock tickers, the present modified shift mechanism has been devised.

The wheel 405 and the spacing mechanism are unchanged except that this mechanism is moved bodily to the left of the type guide 118 and simply performs the spacing operations. The shift mechanism above described is eliminated and shaft 406 with wheel 405 are arranged for rotation only. Tape guide 417, as before, is supported to the right of the type guides 118, all as shown in Figure 11.

A platen block 488 is mounted on a head 489 which is mounted slidably in a guide bracket secured to frame 400. An extension 491 of member 489 is pivotally linked to a rocker arm 492 which is pivotally supported from frame 400 at 493. Ribbon shift pivot 318 is secured to and movable with an extension 494 of arm 492. A spring 495 connected to arm 492 tends to throw arm 492 with 488 and 489 forward into shifted position. Block 488 is just wide enough to be positioned under one of the characters carried by type bars 116 as shown in Figure 10. Secured to head 489 are a plurality of members 495, which, as the head is moved in the shift operation are arranged to depress the edges of the tape in order to insure contact with the tape of only the one character under which block 488 has been interposed. It will be seen that as 492 is rocked, either an upper or lower case figure will be printed, and the ribbon will be properly shifted by the movement of extension 494.

A pin 496, secured to 492, is in slidable engagement with a slot in the end of a shift operating member 497. Member 497 is pivoted at a point 498 and urged to the right in Figure 10 by a spring 499, to maintain a cam projection 500 thereon, against bar 125 of the printer bail operating frame. A special shift control bar 501 is added to notched selector bars 59 to 62, and an extra cam, selector finger and latch, are added to the selector cam shaft to control this bar by a line impulse in the same manner as the selector bars 59 to 63 are controlled. The signal periods, when this bar is added, will be made up of eight intervals, namely, a start interval, five selector bar control intervals, a shift control interval, and a stop interval. The transmitter will be arranged to transmit a marking condition in the shift control interval when block 488 is to be shifted to print an upper case figure, and to transmit a spacing condition when block 488 is to remain in the letter printing position. The selector cams will of course be spaced accordingly, in proper angular and axial position. A stop projection 502 is carried by bar 501 in such a position that it will be directly beneath the end of shift control bar 497 when bar 500 is in unactuated position, and a wide slot is cut directly beneath bar 497 in all the notched selector bars so that bar 497 can move into these wide slots with the selector bars either in actuated or unactuated position. When a marking impulse is received during the shift control interval, bar 500 will be permitted to move to the left in Figure 12 under the influence of its spring 65 and as the printing bail moves upward, bar 497 will rock on its pivot 498 under influence of spring 499 with cam projection 500 in engagement with bar 125, and will move into the wide selector bar slots. The actuating bar 108 selected by the arrangement of the notched bars will also be moved into its aligned slots. When the two bars have reached the bottoms of their respective slots, bar 497 will have moved to a position which will have caused arm 492 to be moved by spring 495 to shift block 488 into its forward or upper case position. The printing stroke of the selected type bar will then commence and there will be no further movement of bar 497 until the printing has been effected and the selected type bar has returned to normal. Then the return or downward movement of the printer bail frame will cam the selected actuating bar 108 and bar 497 out of the aligned slots. As soon as the bars 108 and 497 have been lifted clear of the notched selector bars, member 77 is actuated by cam 90 to restore the selector bars and the shift control bar 501 to unactuated position, when stop projection 501 will again be positioned under bar 497. Until another code combination, with a marking impulse in the seventh interval is received, bar 501 will be locked in the position shown in Figure 12 by its control finger, and platen block 488 will be held to the rear or in lower case position as shown in Figure 10.

*Multiple magnet selector and magnet printing.*

Having described the complete mechanism for the tape printer used with a single magnet selector, and shown how parts thereof are adapted for use with a page printer, a tape printer using the new multiple magnet selector will be described. It will be understood that the multiple magnet selector and magnet printer together with the type action, type guides ribbon feed, etc., are assembled in the same manner as in the single magnet printer hereinbefore described so that by simply turning these mechanisms over, they may be applied in a page printer. As the only changes are in the selector unit, the printing bail, and bail operation, numerals heretofore used will be applied to like parts and the description thereof will not be repeated. Reference numerals beginning with 600 will be applied to the new parts for the sake of convenience in description.

Figure 13:
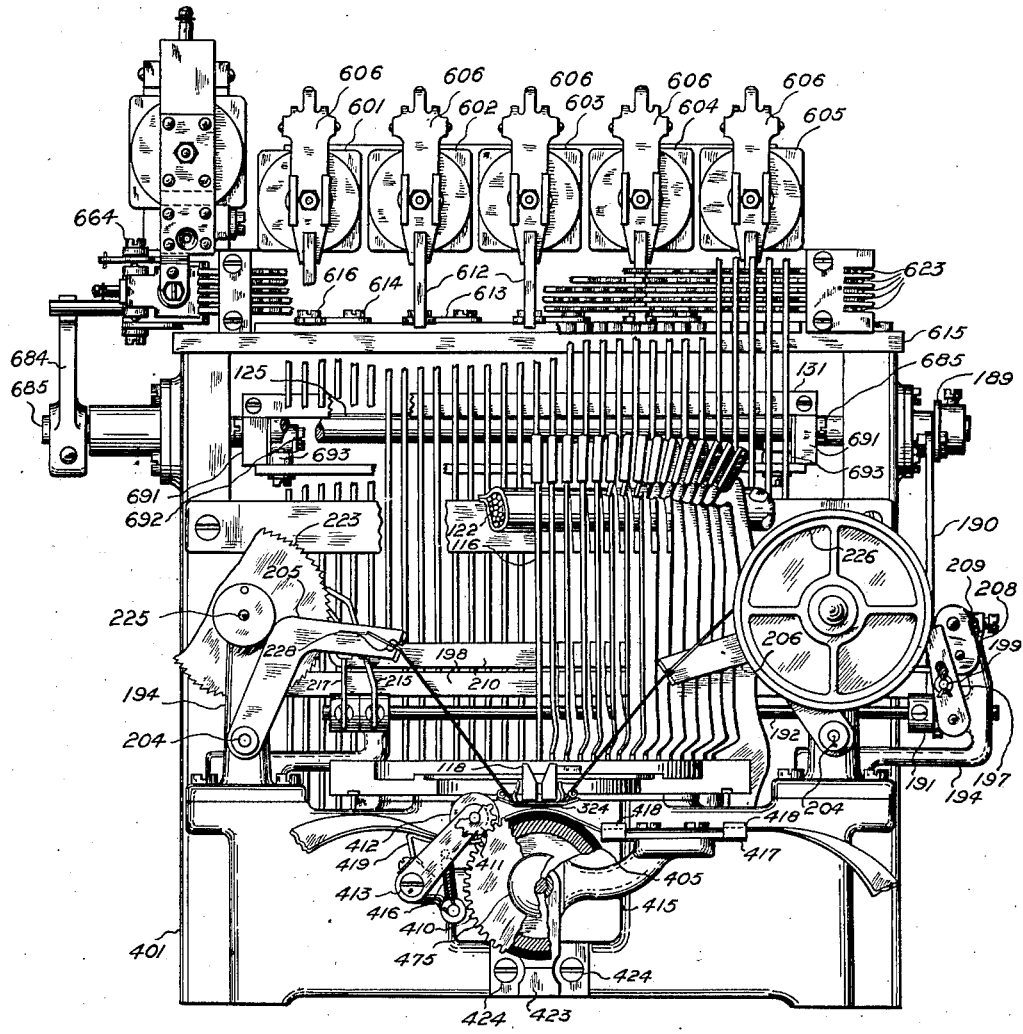
Figure 13 is a front elevation of a tape printer using the multiple magnet selector.

As is well understood in the art, incoming selective combinations of electrical impulses are distributed in proper sequence to selector magnets 601 to 605. Individual to each selector magnet is an armature 606 (Figure 13). Armatures 606 are pivotally mounted at 607 (Figure 14) in slots 608 on supports 609, and are limited in movement by adjustable stop members 611. Springs 610 normally hold armatures 606 against stops 611. Mounted on armatures 606 are extensions 612. Extensions 612, at their ends are engaged by adjusting members 613. Members 613 are pivotally mounted at 614 (Figure 15) on supporting member 615. Set screws 616 (Figure 15) engage slots in members 613. In assembling the selector mechanism, members 613 are adjusted about pivotal points 614 until armature extensions 612 are in proper relation with respect to selector bars 617 to 621 inclusive (Figure 14), and screws 616 are then tightened to clamp members 613 in place. Due to the pivotal mounting of armature 606 in slots 608, and a slight side movement permitted by the looseness of mounting on support 609, adjustment of the extension members in the direction of the length of the selector bars may thus be made.

A series of five slots 622 (Figure 15) are cut into the lower edge of each of the bars 17 to 21. The slots in bar 617 are placed in such a manner, that with magnet 601 de-energized and armature 606 thereof in retracted position, the shoulder formed by the first slot to the left in Figure 15 engages armature extension 612 of magnet 601 to hold bar 617 to the right in unselected position. The remaining four slots in bar 617 are positioned in such a manner that bar 617 clears the extensions 612 of magnets 602 to 605 on movement of 617 in either direction. The slots on the remaining bars are positioned in similar manner, so that armature extension 612 of magnet 602 acts as a stop to hold bar 618 in unselected position, and magnets 603, 604 and 605 control bars 619, 620 and 621, respectively. It will be apparent that each extension 612 acts as a stop to retain a single selector bar against motion while permitting free motion in both directions of the bars not controlled thereby. Selector magnets 601 to 605 control bar 617 to 621, respectively. Springs 623 are carried by a bevelled block 624 supported adjustably by screws 625 and 626. The tension of springs 623 may be simultaneously adjusted by adjusting screws 625 and 626.

Figure 15:
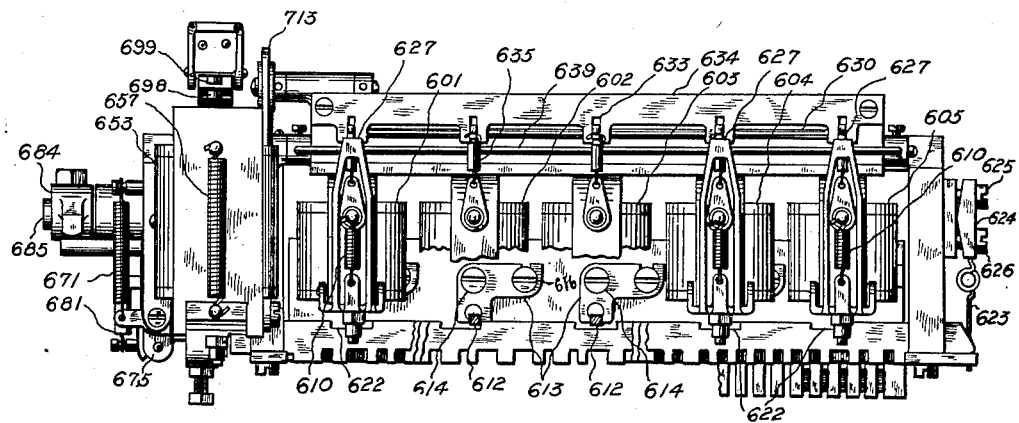
Figure 15 is a plan view of the multiple magnet selector with parts broken away.
Figure 6:
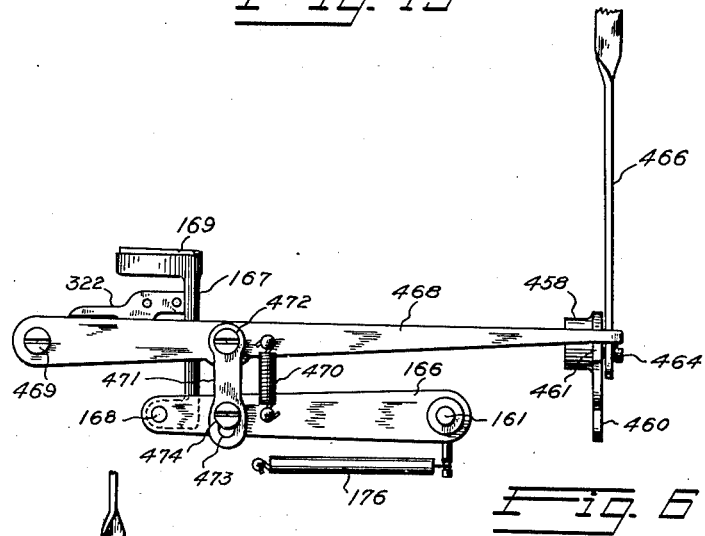
Figures 5 and 6 are detail fragmental views showing the spacing mechanism.
Figure 5:
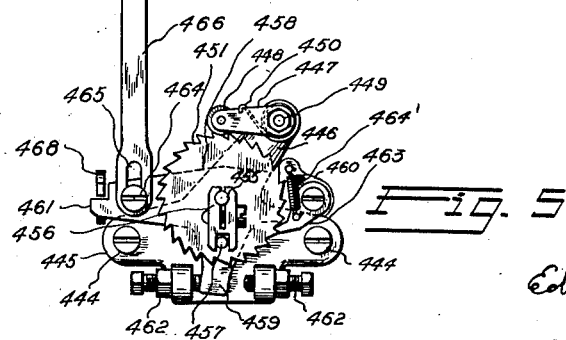

Extensions 627 (Figures 14 and 15) of armatures 606 extend rearwardly and are engaged by latch members 628. Latch members 628 are pivotally mounted on spindle 630 (Figures 15 and 16) extending across the mechanism, rigidly supported in lugs 631 and 632 (Figure 16) and held in properly spaced relation by slots 633 in guide plate 634 (Figure 15). Springs 635, fastened to supports 609 by clips 636 and pins 637, hold latches 628 in engagement with extensions 627. Pins 637 extend through openings in extensions 627 and springs 610 are fastened thereto. As armatures 606 are attracted by magnets 601 to 605, extensions 627 slide over shoulders 638 of latches 628 (Fig. 14) and latches 628, moving under the influence of springs 635, lock the actuated armatures 606 in attracted position.

As any one of the latches 628 moves forward on energization of the respective selector magnet it actuates bail 639 (Figures 14 and 15). Bail 639 extends across all of the latches 628, and at its ends is bent at right angles forming arms 640 and 641 which are rigidly fastened to collars 642 and 643. Collars 642 and 643 are fastened to spindle 644 (Figure 16) rotatably mounted in supports 631 and 632, and as 639 is moved by latches 628, 644 is rotated. Rigidly fastened to 644 is a rocking member 645 (Figures 16 and 17) and loosely mounted on 644 is locking member 646. Integral with 646 is a projection 647. To collar 648 (Figure 16) rigidly fastened to 644, is fastened a helical spring 649. Spring 649 forces member 646 forward to hold lug 647 in contact with rocking member 645. Toe 650 of rocking member 645 is adapted to be engaged by the teeth of ratchet wheel 651 (Figures 16 and 17). Ratchet wheel 651 is rotatably mounted on spindle 652 carried by support 632, and as it rotates, member 645 is rocked and actuates bail 639. With armatures 606 in normally retracted position, bail 639 rests on latches 628 due to the influence of spring 649, locking member 646 is thrown upward, and toe 650 is disengaged from ratchet wheel 651.

After magnets 601 to 605 have been controlled in accordance with an incoming selective combination of signals, a local impulse is sent by the usual distributor to operating magnet 653. Armature 654 of magnet 653 is pivotally mounted on support 655 and held in normally retracted position against stop 656 by spring 657. Locking member 656 is normally positioned beneath a block 659 carried by an extension 658 of armature 654, and prevents actuation thereof until one of the armatures 606 has been actuated. When an armature 606 is actuated, the corresponding latch 628 moves bail 639 and rocks 644, thereby moving 646 out from under block 659 to permit movement of armature 654 when a local impulse is received by 653. Extension 658 carries a projection 660 (Figure 17) and a screw 661 locked in place by a lock nut.

Pivotally mounted on support 663, at points 664 is a selector bar locking member 666. Member 666 is bent upwardly to form an extension 667 (Figure 18) adapted to engage shoulders 668 and 669 on the lower surface of selector bars 617 to 621. An extension 670 of member 666 is fastened to spring 671, the lower end of which is attached to a pin 672 projecting from support 663. (Figures 1 and 3.) Under the influence of spring 671, member 666 is pressed upwardly against the selector bars and engages shoulders 668 and 669, depending on the position of the respective selector bars.

Restoring member 675 is pivotally mounted at its rear end in support 663 at 676. Restoring pawl 677 is pivotally mounted at 678 on the forward end of member 675. Projecting from pawl 677 is a stop member 679 carrying a pin 680. A spring 681, fastened to pin 680 at its forward end and to a pin 683 at its rear end normally maintains pawl 677 in forward position engaging selector bars 617 to 621 with stop 679 against member 675. It will be apparent that stop 679 in this manner limits forward motion of pawl 677 under influence of spring 681. Screw 661 extends through opening 683 in pawl 677 and acts as a stop to limit the pivotal movement of member 675 away from the selector bars. Extending from member 675 is an operating pin 683. Operating pin 683 is engaged by an arm 684 secured to a printer operating bail shaft 685. A spring 686 forces member 675 to the left in Figure 18.

Shaft 685 is journaled in side frames 400 and has rigidly secured thereto an arm 686 (Figure 14) the other end of which is secured to the plunger 687 of printing magnet or solenoid 688 by means of connecting link 689. A powerful spring 690 normally holds the plunger 687 in upward position in Figure 14. Rigidly secured to and rotatable with shaft 685 are printer bail frame end pieces 691 on which bars 125 and 131 are supported (Figures 13 and 20). Pivotally supported from end pieces 691 at points 692 are supporting members 693. Secured to members 693 is universal operating bail 128. Springs 694 (Figure 20) are secured at one end to pins 695 extending from 693 and at the other end are secured to adjusting screws 696. Adjusting screws 696 are supported from end pieces 691 and spring 694 normally throw members 693 upward so that the ends of bar 128 will engage end pieces 691 as shown in Figure 13.

The operation of printing magnet 688 is controlled by closure of contacts 698 and 699. Contact 699 is mounted on a spring member 700, normally tending to separate 699 from 698. An arm 701 (Figure 14) pivotally mounted at 702 controls spring member 700. An operating member 705 for arm 701 is pivotally connected to ears 703 on arm 701 at 704. Member 705 extends horizontally and extension 706 thereof passes through a guide hole in block 659 and armature extension 658. As armature 654 nears the end of an energizing stroke, block 659 engages shoulders 707 of member 705 and presses 705 downwardly. Actuation of 705 moves arm 701 to close contacts 798 and 799. A latch arm 708 pivotally mounted at 709 is normally held against the end of arm 701 by a spring 710. As contacts 798 and 799 are closed, the end of 701 moves rearward until recess 711 permits spring 710 to move latch 708 upwardly thereby locking contacts 698 and 699 in closed position. Magnet 688 then energizes and causes a printing stroke of printer bail structure. As the printing bail structure nears the end of its stroke, universal bar 128 carried thereby engages the upper end 712 of arm 708 and releases arm 701, thereby permitting contacts 798 and 799 to restore to normally open position.

Pivotally mounted on block 659, carried by armature extension 658, is an actuating pawl member 713 (Figure 17). A spring 714 normally holds pawl tooth 715 in engagement with ratchet wheel 651. As armature 654 is depressed, tooth 715 rides over the following tooth of ratchet wheel 651, and as armature 654 retracts under influence of spring 657, when magnet 653 de-energizes, ratchet wheel 651 is stepped and rocks member 645. Movement of 645 actuates bail 639 to engage latches 628 and release armatures 606, and condition selector magnets 601 to 605 to receive a succeeding selection.

The type action, ribbon feed mechanism, spacing mechanism, carriage and shift mechanisms are exactly the same as hereinbefore described for the single magnet tape printer. The parts have been shown in Figures 13 and 14, and the reference numerals heretofore used for like parts have been applied here. A full understanding of the operation of these parts will be had by referring to the description thereof already given. It will be noted that the ribbon feed actuating arm 189 is rigidly secured to bail shaft 685.

*Operation.*

In event none of the magnets 601 to 605, inclusive, are energized by incoming impulses, member 646 remains positioned under block 659, and although a local impulse is sent to operating magnet 653, actuation of armature 654 is prevented. However, if any of the magnets 601 to 605 are energized, the respective armatures 606 are attracted, and members 627 are moved to permit actuation of the corresponding latch members 628. Forward movement of any one of the members 628 actuates bail 639 to rock member 645 on spindle 644 and holds 639 in forward position. Movement of 645 removes the end of 646 from under block 659 to permit actuation of armature 654. 646 is held in removed or actuated position until latches 628 are restored. Forward movement of latches 628 also causes extensions 627 to slide over shoulders 638 and locks armatures 606 in attracted position. Assuming that magnets 601, 603 and 605 are actuated by an incoming combination of electrical impulses, their armatures 606 will be locked in attracted position. Extensions 612 of these magnets will therefore be withdrawn from slots 622 of selector bars 617 to 621. Normally, locking member 666 holds selector bars 617 to 621 in unselected position. After magnets 601 to 605 have been set, a local impulse is sent to operating magnet 653. Since locking member 646 has been actuated, armature 654 is attracted. Movement of armature 654 first causes projection 660 to disengage pawl 677 from selector bars 617 to 621, and then causes screw 661 to disengage locking member 666 from shoulders 668. As member 666 is depressed, selector bars 617, 619 and 621 are moved to the left in Figure 13 under the influence of springs 623. Since magnets 602 and 604, have not been energized, extensions 612 of their armatures remain in slots 622 and engage the shoulders formed thereby in bars 618 and 620. Bars 618 and 620 are therefore held against movement. Movement of bars 617, 619 and 621 aligns a series of slots in well known manner to permit selection of an actuating bar 108.

After movement of bars 617, 619 and 621 has been permitted, further movement of armature 654 causes block 659 to engage shoulders 707 on bar 705 and rocks arm 701 to close contacts 698 and 699. As contacts 698 and 699 are closed, latch member 708 locks them in closed position. Closure of contacts 698 and 699 energizes magnet 688 cause the printing bail structure to move upward. This movement of the bail structure permits a bar 108 to drop in the aligned slots, and then moves bar 108 upward in the aligned slots to print a character. Upward movement of the bail structure causes arm 684 to move away from 683 and spring 686 forces restoring member 675 to the left in Figure 18. As pawl 677 was depressed and 666 released, bars 617, 619 and 621 moved to the left in Figures 13 and 18 and over pawl 677. As movement of 675 under the influence of spring 686 continues, pawl 677 is disengaged from the selector bars and moved forward under influence of spring 681 in a position to re-engage the ends of the selector bars for restoration on the return stroke of the printing bail structure. Movement of 675 is limited by engagement of pawl 677 with screw 661.

The local impulse sent to magnet 653 is momentary, but of sufficient duration to actuate armature 654 completely. While the printing bail is being actuated to print a character, armature 654 restores under the influence of spring 657, permitting member 666 to lock bars 617 to 621 in their selective positions. Further upward movement of 654 causes pawl member 713 to actuate ratchet wheel 651, causing bail 639 to depress latches 628 which have been raised and thereby release armatures 606 of magnets 601, 603 and 605. These armatures restore partially, until members 612 engage the lower edges of bars 617, 619 and 621 which have been locked in actuated position. Sufficient movement of the armatures is permitted to free members 627 from engagement with shoulders 638, thereby immediately placing all the selector magnets in condition for a succeeding selection. Assuming that on the next selection, magnets 601 and 604 are energized, their armatures 606 will be locked in attracted position, and bail 639 will again be raised by latches 628.

As the bail structure approaches the end of the printing stroke, bar 128 engages member 712 and releases contacts 698 and 699. Opening of contacts 698 and 699 causes printing magnet 688 to deenergize and the entire bail structure will restore under the action of spring 690. Restoration of the bail structure first raises bars 108 from engagement with the selector bars, and then member 684 engages pin 683 and forces member 675 to the right in Figures 13 and 18, causing pawl 677 to engage the actuated bars 617, 619 and 621, and moves these bars to unselected position. Armatures 606 of magnets 601 and 604 have been locked in actuated position by energization of these magnets. Armatures 606 of magnets 602, 603 and 605, however, are now free to, and do restore completely by moving into slots 622 on the restoration of bars 618, 619 and 621. Bars 618, 619 and 621 will therefore be held against movement until armatures 601, 603 and 605 are again energized in a selection.

As soon as the printing bail structure has completely restored, and has restored the actuated ones of bars 617 to 621, another local impulse may be sent to magnet 653. Bars 617 and 620 will move under the influence of springs 623 and bars 618, 619 and 621 will be held against movement. Printing and the overlap selection of the succeeding character will proceed in the above described manner.

It will be apparent that a simplified selecting mechanism has been described, in which a complete overlap within the selector is secured, without the interposition of storage or intermediate members between the selector magnet armatures, and the selector bars. It will also be apparent that the succeeding character may be set up on the selector magnets before the actuating bar previously selected is removed from the aligned slots of the selector bars.

The operation of the printing actions and mechanisms will be understood from the description thereof in given connection with the single magnet tape printer. In order to give the spring printing effect which is necessary for satisfactory printing operation the printing bail structure shown in Figure 20 has been devised. It will be seen that as magnet 688 is energized, shaft 685 will be thrown upward and will move with it members 691 and bars 125 and 131. The movement of the members 691 will be transmitted to bail 128 through pivots 692 and spring or springs 694. As bail 128 engages a shoulder 111 of an actuating bar, spring or springs 694 will be stressed, and regardless of the amount of local energy supplied the solenoid 688, a uniform spring printing impact will be attained. This permits the use of a very powerful printing magnet 688 and restoring spring 690, and a printing blow of any desired uniform strength may still be obtained by adjusting the tension of springs 694, accordingly. By this arrangement the magnet may be made amply powerful so that the variations in local circuit and potential conditions will not affect the smooth and uniform operation of the printer. Since a number of operations requiring considerable power are performed on the return movement of the printing bail structure, particularly when the selector is used to operate a page printing mechanism such as disclosed in co-pending application Serial No. 649,562, by this arrangement, spring 690 may be made powerful enough to perform these operations satisfactorily. It will be seen that this arrangement for operation of the entire printing mechanisms is an important feature of the invention.

*Multiple magnet cam actuated printer.*

The multiple magnet selector as described may be readily adapted for operation with the motor driven cam acutated printing mechanism hereinbefore described either in a tape or a page printer. This may be desirable where a keyboard transmitter is to be combined with the receiver, or where motor operation of printing is preferred.

Such a modification is shown in Figure 21 in which only the changed parts are shown and so much of the remaining mechanism as will be necessary for a full understanding thereof.

The printing action and selector bar restoring members 77 mounted on spindle 79 together with member 76 remain the same as described in the single magnet form which may be referred to for a complete disclosure. The selector bars 617 to 621 are the same, and controlled in the same manner by magnets 601 to 605, as in the multiple magnet form herein described. The selector bar restoring and locking parts, together with the printer magnet contacts controlled by magnet 653, and arm 684, are entirely eliminated, leaving pawl 713 with ratchet wheel 651 and member 705, operated by sixth pulse magnet 653 as in the multiple magnet printer. For the selector bar restoring parts, arm 77 operated by 79 is substituted as shown in Figure 21. The cam operated latch member 73 for releasing member 76 to initiate operation of the printing shaft and permit selector bars 617 to 627 to move to selected position is eliminated and a latch member 716 is provided. Member 716 is rigidly mounted on a spindle 717 which is carried from frame 400 by a bracket 718. An arm 719 is also secured to and rotatable with spindle 717 and at the other end is pivoted to member 705. A spring 720 is provided which normally forces member 705 to the left in Figure 20 and holds latch 716 in a position to hold bars 617 to 621 in unselected position against the tension of springs 623.

*Operation of multiple magnet cam operated printer.*

The operation of the selector magnets proceeds as described for the magnet operated printer. After the selection is set up on the magnets 601 to 605, magnet 653 is actuated and on the down stroke operates 705 to remove latch 716 from engagement with member 76. Springs 623 then force the selected bars to selected position which rocks spindle 79 to cause engagement of the printer clutch, and initiates the printing cycle as set forth in the description of the single magnet printer. Armature 654 of magnet 653 is then restored by its spring 657 and operates ratchet wheel 651 to condition the selector magnets immediately for the succeeding selection as described for the magnet operated printer. Printing then proceeds while a succeeding selection is being set up on magnets 601 to 605. At the end of the printer cam rotation spindle 75 is rocked to restore the actuated ones of bars 617 to 621 and immediately thereafter magnet 653 is again energized to initiate the printing of the character combination which is set up on the selector magnets.

It will be seen that a very simple multiple magnet cam operated printer is provided which may as in the case of the other forms described be used either as a tape or page printer.

It will also be seen that many modifications of the mechanisms described may be devised by a person skilled in the art, and these modifications and independent uses of the various new subcombinations will all be within the spirit of the present invention, which is not limited to the particular embodiment or relations shown, but is to be limited in scope only by the terms of the claims hereinafter made.

The telegraph printer for stock market quotations herein set forth is more particularly described and claimed in the copending application, Serial No. 68,307, filed November 11, 1925.

Having described preferred embodiments of the invention what is desired to be secured by Letters Patent and claimed as new is:

1. In a printing telegraph machine, a subcombination comprising a selecting mechanism embodying a plurality of notched selector members; a plurality of actuating bars controlled by said selector members; a plurality of type bars connected to said actuating bars; operating means for said actuating bars, and a restoring spring individual to each of said actuating bars and the type-bar connected thereto; said subcombination being so proportioned, balanced and constructed that a printing impression of a selected character may be effected in widely different planes, whereby said subcombination may coact with a page printing platen with an upward printing stroke of said type bars, and may coact with a tape printing platen in a tape printing machine to effect a downward printing stroke of said type bars.

2. In a printing telegraph machine, a subcombination comprising a supporting frame work adapted to rest on either of two sides thereof, and a third side of which is adapted to support a tape or a page printing platen mechanism; a selecting mechanism supported adjacent a fourth side of said frame work; a plurality of actuating bars substantially parallel to said platen supporting side controlled by said selecting mechanism; a plurality of type bars linked to said actuating bars and supported from said frame work; and operating means for said type bars supported in said frame work and controlled by said selecting mechanism, said parts being so balanced, constructed and arranged that a printing stroke of a selected type bar will be effected with said frame work resting on either of said first mentioned sides whereby said subcombination may be manufactured according to fixed standards and used interchangeably in the manufacture of tape or page printers.

3. In a tape printing telegraph receiver; a plurality of selecting members; means responsive to received code combinations of electrical conditions selectively controlling said members; a plurality of selectable actuating bars selectively controlled by said members; a plurality of type-bars mounted for a forward and downward printing motion and operatively connected to the lower ends of said actuating bars; means for operating said actuating bars to effect printing of selected characters; a frame work supporting the parts mentioned; a printing platen supported in the lower front portion of said frame work; a tape; and means for feeding said tape from right to left over said platen and across the front of said frame work in a position to receive the impressions of selected characters.

4. A printing telegraph machine comprising a plurality of selector bars each embodying a plurality of notches and movable in various combinations to selectively align said notches; means responsive to received code combinations of electrical conditions for selectively positioning said bars; a plurality of actuating bars selectable by lateral movement into the aligned slots; a plurality of type bars movable forwardly and downwardly connected to and moved by said actuating bars; means for moving said actuating bars longitudinally to impart printing movements to said type-bars; a frame work supporting the parts mentioned; a rotatable platen supported in the lower front part of said frame in a position to coact with the type carried by said bars at the end of a printing stroke; and means for feeding a tape over said platen from right to left across the front of said frame work in a position to receive the impressions of selected characters.

5. The combination as set forth in claim 3 together with a transmitting keyboard upon which said frame is placed in a manner to position the platen directly above and back of the transmitting key bank, in such manner that the printed matter on said tape will at all times be readably visible from the front of the machine up to the last character printed.

6. In a tape printing telegraph receiver; a plurality of selecting members; means responsive to received code combinations of electrical conditions selectively controlling said members; a plurality of selectable actuating bars selectively controlled by said members; a plurality of type-bars mounted for a forward and downward printing motion and operated by said actuating bars; means for operating said actuating bars to effect printing of selected characters; a frame work supporting the parts mentioned; a movable carriage supported in the lower part of said frame work; a rotatable platen mounted on said carriage in the lower front part of said frame work; tape guiding and feeding means coacting with said platen to feed a tape over said platen across the front of said machine from right to left; and means controlled by said selecting members to selectively position said carriage.

7. In a printing telegraph machine, a frame work, a selecting mechanism embodying a plurality of notched selector bars supported in the upper part of said frame work; a plurality of substantially vertically movable actuating bars controlled by said selecting mechanism; a plurality of forwardly and downwardly movable type bars normally in a substantially vertical position linked to said actuating bars; an operating bail for moving said actuating bars vertically to effect forward and downward movement of said type bars; a platen positioned in the lower front part of said frame work; and means for feeding a tape over said platen and across the front of said frame work in substantially horizontal position in a manner to receive impressions of selected characters thereon.

8. In a printing telegraph machine; a selecting mechanism; printing means controlled by said selecting mechanism; operating means for said printing means; a carriage; a printing platen mounted on said carriage; means controlled by said selecting mechanism and actuated by said operating means to positively move said carriage to a printing position for one set of characters, and means controlled by said selecting mechanism and actuated by said operating means to positively move said carriage to a printing position for a different set of characters.

9. In a printing telegraph machine, a selecting mechanism responsive to received combinations of electrical conditions; a printing mechanism comprising a plurality of sets of characters, controlled by said selecting mechanism; a platen coacting with said printing mechanism; a movable carriage upon which said platen is mounted; and means for releasably latching said carriage in a plurality of positions to effect printing of selected ones of any of said sets of characters.

10. A printing telegraph machine comprising a selecting mechanism; a printing mechanism controlled by said selecting mechanism; operating means for said printing mechanism; a shift mechanism coacting with said printing mechanism; means comprising a cam to force said shift mechanism into shifted position; and means to force said mechanism into unshifted position; both of said last mentioned means being controlled by said selecting mechanism and operated by said actuating means.

11. A printing telegraph receiver comprising a selecting mechanism embodying a plurality of notched selector bars; a plurality of selectable actuating bars selectively controlled by said selector bars; a plurality of type-bars embodying two sets of characters linked to said actuating bars; a cooperating platen shift mechanism coacting with said platen to effect printing of either of said sets of characters; an actuating bar controlled by said selecting mechanism to mechanically force said platen into position to print one of said sets of characters; and an actuating bar controlled by said selecting mechanism to mechanically force said platen into position to print the other of said sets of characters.

12. In a printing telegraph machine; a selecting mechanism; a plurality of type carrying bars controlled by said selecting mechanism and movable forwardly and downwardly to effect printing of characters; a rotatable platen positioned in the lower front part of the machine; means coacting with said platen to feed a tape over said platen and across the lower front part of the machine from the right to the left thereof; the characters on said type bars being inverted so that the characters printed thereby are readably visible from the front of the machine.

13. In a printing telegraph machine, a selecting mechanism responsive to received code combinations of electrical impulses; a printing mechanism controlled by said selecting mechanism; a tape platen coacting with said printing mechanism; and a rotatable axially movable shaft upon which said platen is mounted.

14. The combination as set forth in claim 13 together with a movable carriage upon which said platen and shaft are supported; and a relatively fixed spacing mechanism actuated by said printing mechanism for rotating said shaft to effect spacing between printed characters.

15. The combination as set forth in claim 13 together with a movable carriage upon which said platen and shaft are mounted; and paper feeding means mounted on said carriage and coacting with said platen.

16. The combination as set forth in claim 13 together with a movable carriage upon which said platen and shaft are mounted; tape feeding means coacting with said platen and driven by said shaft; and tape guiding means mounted on said carriage.

17. In a printing telegraph machine; a selecting mechanism responsive to received code combinations of electrical impulses; a printing mechanism controlled by said selecting mechanism; a tape platen coacting with said printing mechanism; and a spacing mechanism actuated by said printing mechanism comprising a stepping ratchet and pawl mechanism, and an endwise movable shaft rotated thereby upon which said tape platen is mounted.

18. A tape printing mechanism comprising selecting means responsive to received combinations of electrical impulses; a plurality of type-bars selectively controlled by said selecting means; a pair of fixed type guides coacting with said type-bars; a fixed ribbon feeding mechanism; a movable carriage; a rotatable shaft axially movable with said carriage; a tape platen mounted on said shaft; and a ribbon guiding means mounted on said carriage and actuated by said type-bars to position said ribbon in printing position between said guides and said platen immediately preceding a printing impact of a selected character.

19. In a tape printing mechanism; selecting means responsive to received code combinations of electrical conditions; a plurality of actuating bars controlled by said selecting means; a plurality of type-bars linked to said actuating bars; operating means for said actuating bars; a movable carriage; a rotatable shaft supported on said movable carriage; a platen mounted on said shaft; means for moving said carriage to shift said platen and said shaft axially to determine which of two characters carried by a selected type bar shall be printed; and means for rotating said shaft to effect spacing between printed characters comprising a stepping mechanism partially operated by said type-bars and completely operated by said operating means.

20. The combination as set forth in claim 19 in which said stepping mechanism comprises a drive ratchet, and a pawl mechanism advanced over the tooth of said ratchet by the printing stroke of a selected type-bar; and actuated to rotate said ratchet by a return stroke of said operating means.

21. In a printing telegraph machine; a shift mechanism; a cam member to move said shift mechanism to shifted position; and a cam member to restore said shift mechanism to unshifted position.

22. A printing telegraph machine comprising a plurality of selector magnets; a plurality of longitudinally movable selector bars controlled by said selector magnets; a magnet controlling longitudinal movement of said selector bars; a plurality of actuating bars controlled by said selector bars; operating means for said actuating bars; a rotary cam shaft for actuating said operating means, and a clutch controlled by said operating magnet to initiate rotation of said cam shaft.

23. In a tape printing telegraph machine; a selecting mechanism comprising a plurality of notched selector members; a plurality of actuating bars adapted to engage said selector members and to be selected by movement into aligned notches thereof; typebars controlled by certain of said actuating bars each mounted for a forward and downward printing stroke; a carriage mounted for forward and rearward motion; a printing platen mounted on said carriage; means for shifting said carriage to forward position comprising one of said actuating bars; means for shifting said carriage to rearward position comprising one of said actuating bars; and means for moving said actuating bars to effect the selected operations.

24. In a tape printing telegraph machine; a selecting mechanism comprising a plurality of notched selector members; a plurality of actuating bars adapted to engage said selector members and to be selected by movement into aligned notches thereof; type bars linked to certain of said actuating bars each mounted for a forward and downward printing stroke; a carriage mounted for forward and rearward motion in a substantially horizontal plane; a rotatable printing platen mounted on said carriage; an actuating bar for moving said carriage to forward position; an actuating bar for moving said carriage to rearward position; and an operating bail for moving each of said actuating bars through the aligned selector bar slots to effect the selected operations.

25. A tape printer comprising a selecting mechanism; printing mechanism controlled by said selecting mechanism; a platen coacting with said printing mechanism; a tape reel; and means for feeding said tape from said reel in a loop through a tape guide and over said platen.

26. The combination as set forth in claim 25 together with a movable carriage controlled by said selecting mechanism upon which said platen and said tape guide are mounted.

27. A tape printer comprising a selecting mechanism; printing mechanism controlled by said selecting mechanism; a platen coacting with said printing mechanism; a tape reel; a spring mounted roller; set fixed rollers around which tape from said reel passes in a loop; a tape guide through which the tape passes; and means for feeding said tape from said guide over said platen.

28. In combination in a printing telegraph receiver, a supporting frame, a platen mounted at the lower front portion of the frame, a series of forwardly and downwardly striking type bars cooperating with said platen, a series of substantially vertical actuating bars arranged in rear of said type bars and operatively connected at their lower ends to the lower ends of said type bars, selector mechanism in the rear of and cooperating with said actuator bars to selectively control the same in response to received code combinations and a common operating member for the selected actuating bars.

29. In combination in a tape printing telegraph receiver, a supporting frame, a platen at the lower front portion of the frame, letter space feed mechanism for moving said tape over said platen, a series of forwardly and downwardly striking type bars cooperating with said platen to effect the printing of selected characters on the tape, a corresponding series of substantially vertical actuating bars arranged in rear of said type bars and operatively connected at their lower ends to the lower ends of the type bars, a selector mechanism mounted in rear of the upper ends of the actuating bars and comprising a set of notched permutation bars adapted to be shifted in response to received code combinations to align the notches thereof and thereby selectively control said actuating bars, and a common operating mechanism for effecting the lateral movement of the actuating bars into and out of engagement with the permutation bars and the longitudinal operating movements thereof and for actuating said letter space mechanism.

30. In combination in a tape printing telegraph receiver, a supporting frame, a platen mounted at the lower front portion of the frame, a series of type bars mounted in the frame in rear of the platen to strike downwardly and forwardly thereon, a series of actuating bars in rear of said type bars and operatively connected at their lower ends to the lower ends of said type bars, a set of permutation bars and a common striker bar cooperating with the upper portions of said actuating bars to selectively control and effect the operation thereof and of said type bars, and means for selectively setting said permutation bars in response to received code combinations and for initiating the operating of said striker bar.

31. In combination in a tape printing telegraph receiver, a tape platen, a series of type bars pivotally mounted in rear of the platen to strike forwardly and downwardly upon the upper face thereof, means for feeding a tape over the platen, a series of substantially vertical actuating bars in rear of the type bars and operatively connected at their lower ends to the lower ends of the type bars, a set of permutation bars and a common striker bar cooperating with the upper portions of said actuating bars to selectively control and effect the operation thereof and means for setting said permutation bars in different combinations in response to received signals and for initiating the operation of said striker bar.

32. In combination in a tape printing telegraph machine, a supporting frame, a tape platen mounted at the lower front portion of the frame, means for feeding a tape over said platen and across the lower front part of the machine, a series of type bars mounted on the frame in rear of the platen to strike forwardly and downwardly upon the upper portion of the platen, a series of actuating bars in rear of and operatively connected to the lower ends of said type bars, a set of selector bars adapted to be positioned in different combinations in response to received signals for selectively controlling said actuating bars and mechanism mounted on said frame for effecting the operation of the selected actuating bars and of said tape feeding means.

Signed at Long Island City, N. Y., this 7th day of August, 1923.

EDWARD E. KLEINSCHMIDT.